United States Patent
Imamura et al.

(10) Patent No.: US 10,351,141 B2
(45) Date of Patent: Jul. 16, 2019

(54) CONTROL SYSTEM OF POWER TRANSMISSION SYSTEM

(71) Applicant: TOYOTA JIDOSHA KABUSHIKI KAISHA, Toyota-shi, Aichi-ken (JP)

(72) Inventors: Tatsuya Imamura, Okazaki (JP); Atsushi Tabata, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 293 days.

(21) Appl. No.: 15/293,839

(22) Filed: Oct. 14, 2016

(65) Prior Publication Data
US 2017/0106872 A1 Apr. 20, 2017

(30) Foreign Application Priority Data
Oct. 20, 2015 (JP) ................................ 2015-206527

(51) Int. Cl.
*B60W 30/20* (2006.01)
*B60W 20/13* (2016.01)
(Continued)

(52) U.S. Cl.
CPC .............. *B60W 30/20* (2013.01); *B60K 6/26* (2013.01); *B60K 6/28* (2013.01); *B60K 6/365* (2013.01);
(Continued)

(58) Field of Classification Search
CPC .... B60W 30/20; B60W 20/13; B60W 10/026; B60W 10/06; B60W 10/08;
(Continued)

(56) References Cited

U.S. PATENT DOCUMENTS 7,286,922 B1  10/2007  Fischer et al.
8,909,403 B2 *  12/2014  Yokouchi .............. B60K 6/445
                                                701/22
(Continued)

FOREIGN PATENT DOCUMENTS

JP    S57-69165 A    4/1982
JP    2004-084830 A  3/2004
(Continued)

*Primary Examiner* — Anne M Antonucci
*Assistant Examiner* — James E Stroud
(74) *Attorney, Agent, or Firm* — Oliff PLC (57) ABSTRACT

A control system controls a power transmission system located between a motive power source and drive wheels. The power transmission system includes a fluid coupling and an engagement device. The control system includes an electronic control unit configured to: obtain information concerning vibration of the power transmission system; determine whether the vibration of the power transmission system is in a resonance region of the power transmission system; control the engagement device so that the engagement device slips, when the electronic control unit determines that the power transmission system is in the resonance region; and control the motive power source when the electronic control unit determines that the power transmission system is in the resonance region, so that a rotational speed of the motive power source increases as compared with a case where the power transmission system is not in the resonance region.

16 Claims, 9 Drawing Sheets

(51) Int. Cl.

| | | |
|---|---|---|
| *B60K 6/26* | (2007.10) | |
| *B60K 6/28* | (2007.10) | |
| *B60K 6/365* | (2007.10) | |
| *B60K 6/387* | (2007.10) | |
| *B60K 6/442* | (2007.10) | |
| *B60K 6/547* | (2007.10) | |
| *B60W 10/02* | (2006.01) | |
| *B60W 10/06* | (2006.01) | |
| *B60W 10/08* | (2006.01) | |
| *F16H 3/72* | (2006.01) | |
| *F16H 37/08* | (2006.01) | |
| *F16H 59/14* | (2006.01) | |
| *F16H 61/14* | (2006.01) | |
| *F16H 63/50* | (2006.01) | |
| *F16H 45/02* | (2006.01) | |
| *F16H 59/36* | (2006.01) | |

(52) U.S. Cl.
CPC .............. *B60K 6/387* (2013.01); *B60K 6/442* (2013.01); *B60K 6/547* (2013.01); *B60W 10/026* (2013.01); *B60W 10/06* (2013.01); *B60W 10/08* (2013.01); *B60W 20/13* (2016.01); *F16H 3/728* (2013.01); *F16H 37/0806* (2013.01); *F16H 59/141* (2013.01); *F16H 61/143* (2013.01); *F16H 63/50* (2013.01); *B60K 2006/268* (2013.01); *B60W 2400/00* (2013.01); *B60W 2510/081* (2013.01); *B60W 2510/244* (2013.01); *B60W 2520/10* (2013.01); *B60W 2540/10* (2013.01); *B60W 2540/12* (2013.01); *B60W 2710/024* (2013.01); *B60W 2710/025* (2013.01); *B60W 2710/0627* (2013.01); *B60W 2710/081* (2013.01); *B60Y 2200/92* (2013.01); *B60Y 2300/20* (2013.01); *B60Y 2300/421* (2013.01); *B60Y 2300/432* (2013.01); *F16H 45/02* (2013.01); *F16H 2059/148* (2013.01); *F16H 2059/363* (2013.01); *F16H 2061/145* (2013.01); *F16H 2063/504* (2013.01); *F16H 2200/0008* (2013.01); *F16H 2200/0021* (2013.01); *F16H 2200/2007* (2013.01); *F16H 2200/2038* (2013.01); *Y10S 903/93* (2013.01); *Y10S 903/946* (2013.01)

(58) Field of Classification Search
CPC ....... B60W 2400/00; B60W 2510/081; B60W 2510/244; B60W 2520/10; B60W 2540/10; B60W 2540/12; B60W 2710/024; B60W 2710/025; B60W 2710/0627; B60W 2710/081; B60K 6/26; B60K 6/28; B60K 6/365; B60K 6/387; B60K 6/442; B60K 6/547; B60K 2006/268; F16H 3/728; F16H 37/0806; F16H 59/141; F16H 61/143; F16H 63/50; F16H 45/02; F16H 2059/148; F16H 2059/363; F16H 2061/145; F16H 2063/504; F16H 2200/0008; F16H 2200/0021; F16H 2200/2007; F16H 2200/2038; B60Y 2200/92; B60Y 2300/20; B60Y 2300/421; B60Y 2300/432; Y10S 903/93; Y10S 903/946
USPC ........................................................... 701/22
See application file for complete search history.

(56) References Cited

U.S. PATENT DOCUMENTS

| | | | |
|---|---|---|---|
| 2002/0011229 A1* | 1/2002 | Asahara ................. | F02B 67/06 123/192.1 |
| 2004/0043863 A1 | 3/2004 | Kondo et al. | |
| 2008/0154468 A1* | 6/2008 | Berger ................... | B60K 6/365 701/54 |
| 2009/0076693 A1* | 3/2009 | Kumazaki ............. | B60K 6/442 701/55 |
| 2009/0143950 A1 | 6/2009 | Hasegawa et al. | |
| 2010/0286858 A1* | 11/2010 | Otokawa ................ | B60K 6/365 701/22 |
| 2013/0151099 A1 | 6/2013 | Chae et al. | |
| 2014/0224060 A1* | 8/2014 | Murata ................... | F16F 15/31 74/574.4 |
| 2014/0274562 A1* | 9/2014 | Ukon .................. | F16F 15/1478 477/175 |
| 2014/0366682 A1* | 12/2014 | Murata ................. | B60W 10/02 74/572.2 |
| 2017/0370301 A1* | 12/2017 | Srinivasan ............. | F02D 17/02 |

FOREIGN PATENT DOCUMENTS

| | | |
|---|---|---|
| JP | 2009-132195 A | 6/2009 |
| JP | 2011-220350 A | 11/2011 |
| JP | 2013122315 A | 6/2013 |
| JP | 2014-136518 A | 7/2014 |
| JP | 2015-020665 A | 2/2015 |
| JP | 2015075151 A | 4/2015 |

* cited by examiner

| MODE | OUTPUT | FORWARD/BACKWARD | GEAR POSITION | FIRST CLUTCH | BRAKE | SECOND CLUTCH | FIRST ROTATING ELECTRIC MACHINE | SECOND ROTATING ELECTRIC MACHINE |
|---|---|---|---|---|---|---|---|---|
| EV MODE | 1 MOTOR | FORWARD/BACKWARD | — | △ | △ | — | GENERATOR | MOTOR |
| | 2 MOTORS | FORWARD/BACKWARD | — | ○ | ○ | — | MOTOR | MOTOR |
| HV MODE | PARALLEL METHOD | FORWARD | H | — | ○ | — | GENERATOR | MOTOR |
| | | FORWARD | L | ○ | — | — | GENERATOR | MOTOR |
| | | BACKWARD | L | ○ | — | — | GENERATOR | MOTOR |
| | SERIES METHOD | FORWARD/BACKWARD | — | — | — | ○ | GENERATOR | MOTOR |

CONTROL SYSTEM OF POWER TRANSMISSION SYSTEM

INCORPORATION BY REFERENCE

The disclosure of Japanese Patent Application No. 2015-206527 filed on Oct. 20, 2015 including the specification, drawings and abstract is incorporated herein by reference in its entirety.

BACKGROUND

1. Technical Field

The disclosure relates to a control system of a power transmission system that is located between a motive power source and drive wheels, and includes a fluid coupling, and an engagement device that can directly couple the input shaft side and output shaft side of the fluid coupling.

2. Description of Related Art

When a vehicle passes along an undulating road with a markedly uneven road surface, a power transmission system for transmitting driving force from a motive power source, such as an engine and a motor, to drive wheels vibrates along with vertical vibration of the wheels. Further, resonance is generated in a particular portion of the power transmission system, depending on the uneven condition of the road surface and the traveling speed of the vehicle. Under this situation, where the power transmission system includes a hydraulically-operated friction engagement element, the friction engagement element that is hydraulically placed in an engaged state may slip due to variation of transmission torque caused by the vibration, and its durability may deteriorate.

Thus, when resonance is generated in the power transmission system having a friction engagement element or elements for changing the speed ratio, a hydraulic pressure supplied to the friction engagement element that is in an engaged state is further increased, so as to further increase the engaging force of the friction engagement element, according to a technology proposed in Japanese Patent Application Publication No. 2011-220350 (JP 2011-220350 A).

According to the method disclosed in JP 2011-220350 A, the friction engagement element that is in the engaged state is prevented from slipping due to resonance of the power transmission system, thus making it possible to curb reduction of the durability of the friction engagement element.

SUMMARY

However, in the system of JP 2011-220350 A, it is inherently impossible to damp the resonance itself generated in the power transmission system, during traveling of the vehicle, unless the driver intentionally changes the accelerator pedal stroke or position. Therefore, the mechanical strength of the particular portion of the power transmission system which is in a resonant condition may be reduced, or the particular portion may be damaged, due to repeated application of bending stress. Also, the reduction of the durability of the friction engagement element as described above is a phenomenon that may also occur under vehicle operating conditions where excessive transmission torque is continuously applied to the friction engagement element, and some measure against the phenomenon is desired to be taken.

The embodiments provide a control system of a power transmission system, which makes it possible to promptly damp resonance, even when the resonance is generated in a particular portion of the power transmission system.

A control system of a power transmission system according to one aspect relates to a power transmission system located between a motive power source and drive wheels of a vehicle. The power transmission system includes a fluid coupling and an engagement device. The engagement device is configured to control a condition of connection between an input shaft side and an output shaft side of the fluid coupling. The control system includes an electronic control unit. The electronic control unit is configured to obtain information concerning vibration of the power transmission system; determine whether the vibration of the power transmission system is in a resonance region of the power transmission system, control the engagement device so that the engagement device slips, when the electronic control unit determines that the power transmission system is in the resonance region, and control the motive power source when the electronic control unit determines that the power transmission system is in the resonance region, such that a rotational speed of the motive power source increases as compared with a case where the power transmission system is not in the resonance region.

With the control system according to the above aspect, when the power transmission system is in its resonance region, the engagement device is caused to slip, rather than being placed in a directly coupled state, so that fluid that intervenes between the engagement device and the fluid coupling acts as a damper for damping vibration of the power transmission system. As a result, the resonance range of the power transmission system shifts, and its resonant condition settles. Also, at this time, in order to prevent the driver or passenger from feeling uncomfortable or strange about slipping of the engagement device, the electronic control unit increases the rotational speed of the motive power source, so as not to give rise to changes in the traveling state of the vehicle.

In the control system according to the above aspect, the information concerning vibration of the power transmission system may include information concerning mechanical vibration of a particular portion of the power transmission system, variation of output torque, and variation of a rotational speed on the output shaft side of the fluid coupling.

With the control system as described above, the presence or absence of resonance in the power transmission system can be grasped with reliability.

In the control system according to the above aspect, the electronic control unit may be configured to control the engagement device so that a slip amount of the engagement device increases as the vibration of the power transmission system increases, when the electronic control unit determines that the power transmission system is in the resonance region.

With the control system as described above, the engagement device is controlled such that its slip amount increases as vibration of the power transmission system increases, so that resonance generated in the power transmission system can be further promptly damped.

In the control system as described above, the electronic control unit may be configured to control the engagement device so that a slip amount of the engagement device becomes equal to 0, when the electronic control unit determines that the power transmission system is no longer in the resonance region after having been in the resonance region.

With the control system as described above, when it is determined that the power transmission system is no longer in the resonance region, the engagement device is controlled so that its slip amount becomes equal to 0. Thus, a loss of power transmission via the fluid coupling can be eliminated.

In the control system as described above, the slip amount of the engagement device may include a fully released state of the engagement device.

With the control system as described above, when the slip amount of the engagement device is controlled so as to place the engagement device in the fully released state, the damping effect of the fluid coupling can be increased to the maximum.

The motive power source may include one internal combustion engine and two rotating electric machines (for example, two motor-generators). In this case, the power transmission system may further include a planetary gear train mounted between the internal combustion engine and a first rotating electric machine, and the planetary gear train and a second rotating electric machine may be connected in parallel to an input shaft of the fluid coupling, while an output shaft of the fluid coupling may be connected to the drive wheels side. In another example, the input shaft of the fluid coupling may be connected to the second rotating electric machine, and a planetary gear train and the output shaft of the fluid coupling may be connected in parallel to the driving wheels side.

With the control system according to the above aspect, when the power transmission system is in its resonance region, the engagement device is caused to slip, so that the fluid present in the fluid coupling acts as a damper for damping vibration of the power transmission system. As a result, the resonance of the power transmission system can be promptly damped, and heat generated due to slipping of the engagement device is dissipated, so that reduction of its durability can be curbed. Also, when the power transmission system is in its resonance region, the electronic control unit increases the rotational speed of the motive power source, so as not to change the traveling state of the vehicle, so that the driver or passenger is prevented from feeling uncomfortable or strange about slipping of the engagement device.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Some embodiments applied to a hybrid vehicle of front-engine, front-drive type will be described in detail with reference to FIG. 1 through FIG. 9. However, the embodiments are illustrative, not limiting, and the aspects of the disclosure may be applied to any type of vehicle in which a power transmission system including a fluid coupling, and an engagement device that can directly couple the input shaft side and output shaft side of the fluid coupling is located between a motive power source and drive wheels.

Figure 1:
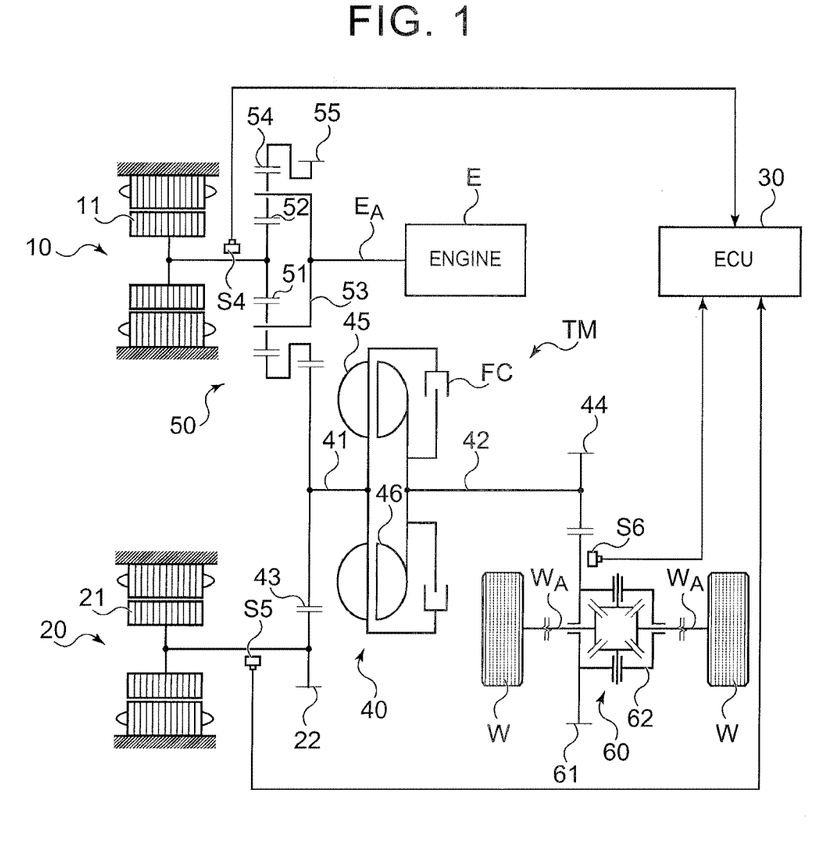
FIG. 1 is a schematic view showing a gear train of one embodiment when it is applied to a hybrid vehicle.
Figure 2:
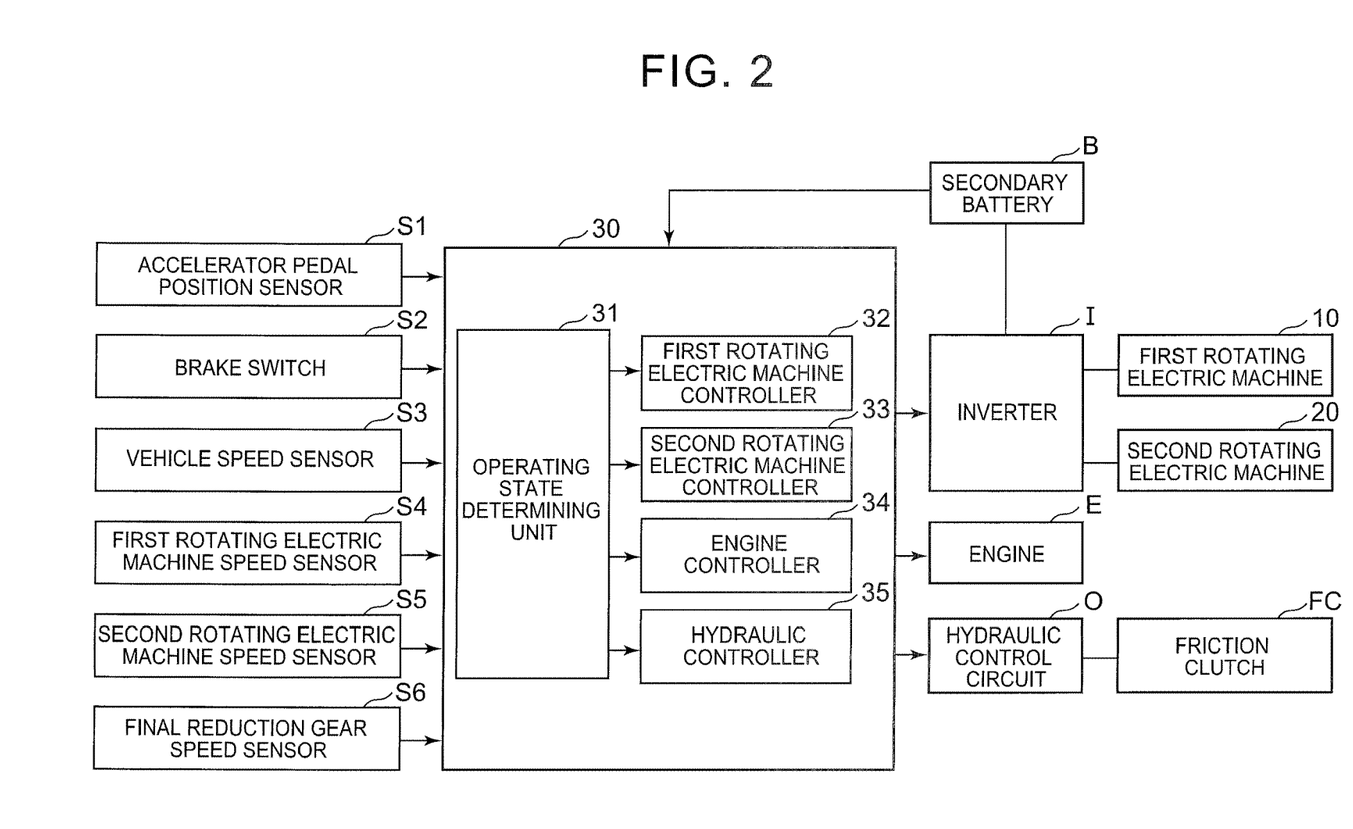
FIG. 2 is a control block diagram of a principal portion in the embodiment shown in FIG. 1.

FIG. 1 schematically shows a gear train of the hybrid vehicle according to one embodiment, and FIG. 2 shows control blocks of its principal portion. The hybrid vehicle of this embodiment includes one internal combustion engine, i.e., an engine E, and first rotating electric machine 10 and second rotating electric machine 20, as a motive power source; however, the disclosure is not limited to this arrangement. For example, the hybrid vehicle can have a motive power source that consists of one engine and one rotating electric machine.

In this embodiment, the hybrid vehicle is able to travel in a selected one of an EV mode in which only the rotating electric machines 10, 20 are operated while the engine E is stopped, and an HV mode in which the engine E as well as the rotating electric machines 10, 20 is operated. An on-board ECU (Electronic Control Unit) 30 switches the traveling mode of the vehicle between the EV mode and the HV mode, based on operating conditions of the vehicle. In either of these modes, the first rotating electric machine 10 having a small capacity mainly functions as a generator for charging a vehicle-mounted secondary battery B, and the second rotating electric machine 20 having a large capacity mainly functions as a motor that applies output torque to right and left front wheels (which will be referred to as "drive wheels") W of the vehicle. While three-phase synchronous motors having high quietness are used as the rotating electric machines 10, 20 in this embodiment, the embodiments are not limited to the use of this type of motors. The ECU is a microcomputer having a central processing unit (CPU) and memory such as ROM and RAM.

When an accelerator pedal (not shown) is not depressed during traveling of the vehicle, or when a brake pedal (not shown) is depressed, the second rotating electric machine 20 functions as a generator according to the SOC (state-of-charge) of the secondary battery B. In this case, regenerative energy is stored in the secondary battery B via the second rotating electric machine 20, and thus functions as so-called regenerative braking. The HV mode is selected only when the amount of depression of the accelerator pedal, or the accelerator pedal stroke, is equal to or larger than a predetermined value, e.g., 60%, or the vehicle speed is equal to or higher than a predetermined value, e.g., 60 km/h, or the SOC of the secondary battery B is smaller than a predetermined value, e.g., 40%. In other words, in cases other than these cases, the EV mode is preferably selected. Accordingly, the vehicle travels backward in the EV mode, but the manner of selecting the traveling mode of the vehicle is not limited to this. The output torque delivered from the engine E in the HV mode is applied so as to drive the first rotating electric machine 10 as the generator, and is also applied as output torque for driving the drive wheels W along with the second rotating electric machine 20.

The amount of depression of the accelerator pedal operated by the driver is detected as the accelerator pedal stroke by an accelerator pedal position sensor S1, and its output value is transmitted to the ECU 30. The operation to depress the brake pedal that is similarly operated by the driver is detected as an ON/OFF signal of a brake switch S2, and its output value is transmitted to the ECU 30. The vehicle speed is detected by a vehicle speed sensor S3, and the information is transmitted to the ECU 30. The SOC of the secondary battery B is calculated by an operating state determining unit 31 of the ECU 30.

The engine E is started by use of the first rotating electric machine 10. Therefore, the ECU 30 incorporates a first rotating electric machine controller 32 that controls operation of the first rotating electric machine 10 via an inverter I connected to the secondary battery B, and a second rotating electric machine controller 33 that controls operation of the second rotating electric machine 20. The first and second rotating electric machines 10, 20 and the engine E are controlled by the first and second rotating electric machine controllers 32, 33 and an engine controller 34 of the ECU 30, respectively, based on vehicle operating conditions including the accelerator pedal stroke, vehicle speed, SOC of the secondary battery B, and so forth. Along with the control, first and second rotating electric machine speed sensors S4, S5 detect the rotational speeds of rotors 11, 21 of the first and second rotating electric machines 10, 20, respectively, and output these items of information to the ECU 30. The engine controller 34 controls operation and stopping of operation of the engine E in preset timing according to vehicle conditions, and also controls the amount of fuel supplied and the timing of supply of the fuel during operation of the engine E.

A power transmission system TM is mounted between the engine E and two rotating electric machines 10, 20, and the drive wheels W. The power transmission system TM of this embodiment includes a fluid coupling 40, friction clutch FC which functions as an engagement device, planetary gear train (which will be referred to as "first planetary gear train" for the sake of convenience) 50, and a differential gear unit 60. The friction clutch FC can couple the input shaft 41 side and output shaft 42 side of the fluid coupling 40, for inhibiting single-phase lock of the second rotating electric machine 20, without intervening fluid. Other known engaging devices, such as a magnetic powder clutch, may be used in place of the friction clutch FC. The differential gear unit 60 connects rotary shafts, i.e., axles $W_A$, of the right and left drive wheels W. In this embodiment, the first planetary gear train 50 mounted between the engine E and the first rotating electric machine 10, and the second rotating electric machine 20, are connected in parallel to the input shaft 41 of the fluid coupling 40, and the output shaft 42 of the fluid coupling 40 is connected to the right and left drive wheels W side.

The first planetary gear train 50 has a sun gear 51 coupled to the rotor 11 of the first rotating electric machine 10, a carrier 53 that rotatably supports planetary gears 52 that mesh with the sun gear 51, and an internally toothed gear 54 that meshes with the planetary gears 52 so as to surround the planetary gears 52. An output shaft of the engine E, i.e., a crankshaft $E_A$, is coupled to the carrier 53 of the first planetary gear train 50.

An input gear 43 provided on the input shaft 41 of the fluid coupling 40 meshes with an externally toothed gear 55 provided integrally with the internally toothed gear 54 of the first planetary gear train 50, and a small gear 22 formed integrally with the rotor 21 of the second rotating electric machine 20. With this arrangement of gears, a rotation speed of the second rotating electric machine 20 corresponds to a rotation speed of the motive power source, which includes engine E, the first rotating electric machine 10, and the second rotating electric machine 20. An output gear 44 provided on the output shaft 42 of the fluid coupling 40 meshes with a final reduction gear 61 of the differential gear unit 60. A pump impeller 45 provided on the input shaft 41 of the fluid coupling 40, and a turbine runner 46 provided on the output shaft 42 of the fluid coupling 40 are connected via the friction clutch FC. When the vehicle is in an operating state other than predetermined operating states, hydraulic oil whose pressure is regulated to a pressure (which will be referred to as "lock-up hydraulic pressure") $P_U$ for keeping the friction clutch FC in an engaged state according to the output torque is supplied to the friction clutch FC. The hydraulic oil is supplied via an electric oil pump (not shown) using the vehicle-mounted secondary battery B as a power supply, and a known hydraulic control circuit O. In this embodiment, the above-mentioned predetermined operating states include the case where the second rotating electric machine 20 is brought into a single-phase locked state, and the case where the power transmission system TM is brought into a resonant condition while the vehicle is traveling on an undulating road, or the like. When the thermal load of the second rotating electric machine 20 is larger than a threshold value that is set in advance based on single-phase lock of the second rotating electric machine 20, the friction clutch FC is controlled from a fully engaged state into a slip state or a fully released state. Similarly, when the power transmission system TM is placed in the resonant condition, the friction clutch FC is controlled from the fully engaged state into the slip state or fully released state, so that the rotational speed of the output shaft 42 of the fluid coupling 40 becomes lower than the rotational speed of the input shaft 41.

The control content of the friction clutch FC associated with single-phase lock of the second rotating electric machine 20 is not directly relevant to this disclosure, and therefore, will not be further explained.

A final reduction gear speed sensor S6 is mounted to a housing 62 of the differential gear unit 60. The final reduction gear speed sensor S6 detects variation of the rotational speed of the final reduction gear 61, and outputs the detected information to the ECU 30. The final reduction gear speed sensor S6 of this embodiment serves to obtain vibration of the power transmission system TM that resonates due to vibration received from the road surface on which the vehicle travels, and is able to grasp the magnitude of changes in the rotational speed that varies due to the vibration, as the amplitude of the vibration. The operating state determining unit 31 of the ECU 30 determines whether variation in rotation of the final reduction gear 61, namely, the amount of variation of the output torque, has exceeded a predetermined threshold value, based on the detection signal from the final reduction gear speed sensor S6. Namely, in the case where the vehicle travels on an undulating road, for example, and the vehicle body vibrates via the drive wheels due to the roughness of the road surface, the power transmission system TM also vibrates in accordance with the vibration of the vehicle body, and resonance may be generated in a particular portion of the system TM. The variation in the rotational speed of a rotating portion caused by vibration is detected by the final reduction gear speed sensor S6 as variation of the output torque. Therefore, when the amount of variation in the output torque exceeds a predetermined value, the operating state determining unit 31 of the ECU 30 determines that the particular portion of the power transmission system TM lies in a resonance region. Namely, the operating state determining unit 31 of the ECU 30 functions to determine whether the obtained vibration of the power transmission system TM is within its resonance region.

It is possible, as a matter of course, to obtain vibration of the power transmission system TM, using an angular velocity sensor or a vibration sensor, in place of the above-described final reduction gear speed sensor S6. While the vibration of the power transmission system TM is obtained from variation in rotation of the final reduction gear 61 of the differential unit in this embodiment, the embodiments are not limited to this arrangement. Nonetheless, with regard to the power transmission system TM having a portion, such as a propeller shaft, having a relatively large amplitude of vibration, it may be preferable to obtain information on vibration of the propeller shaft, or the like.

In this embodiment, the ECU 30 appropriately controls operation of the engine E, first and second rotating electric machines 10, 20, and the friction clutch FC, based on information received from the above-described various sensors S1, S3-S6 and the brake switch S2, for example.

Figure 3:
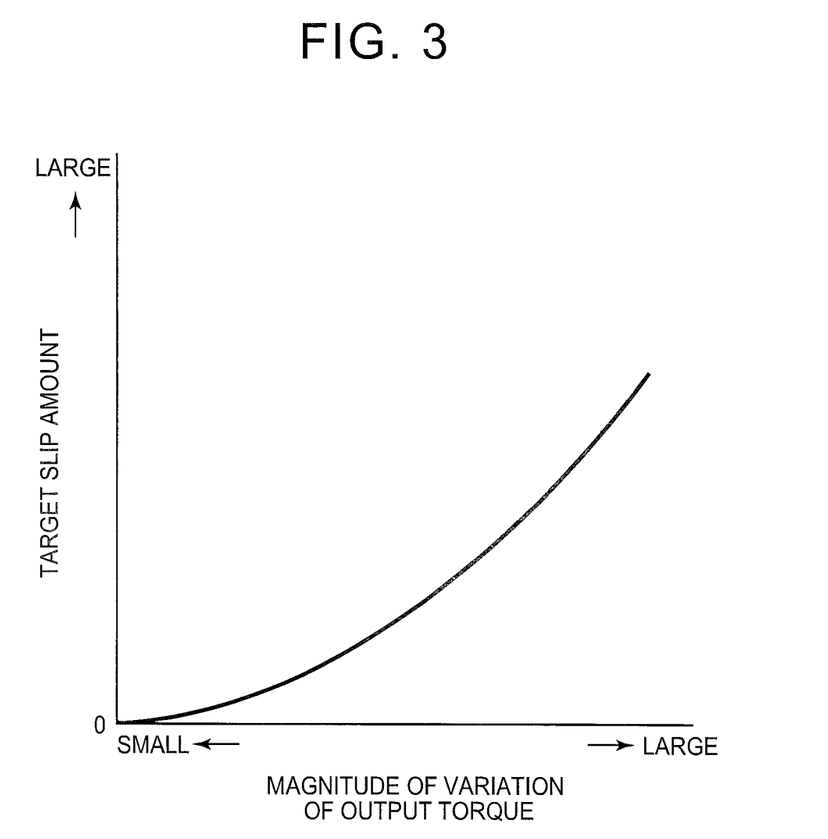
FIG. 3 is a map schematically indicating the relationship between the resonance amplitude of a power transmission system in the embodiment shown in FIG. 1, and a target slip amount of a friction clutch.
Figure 4:
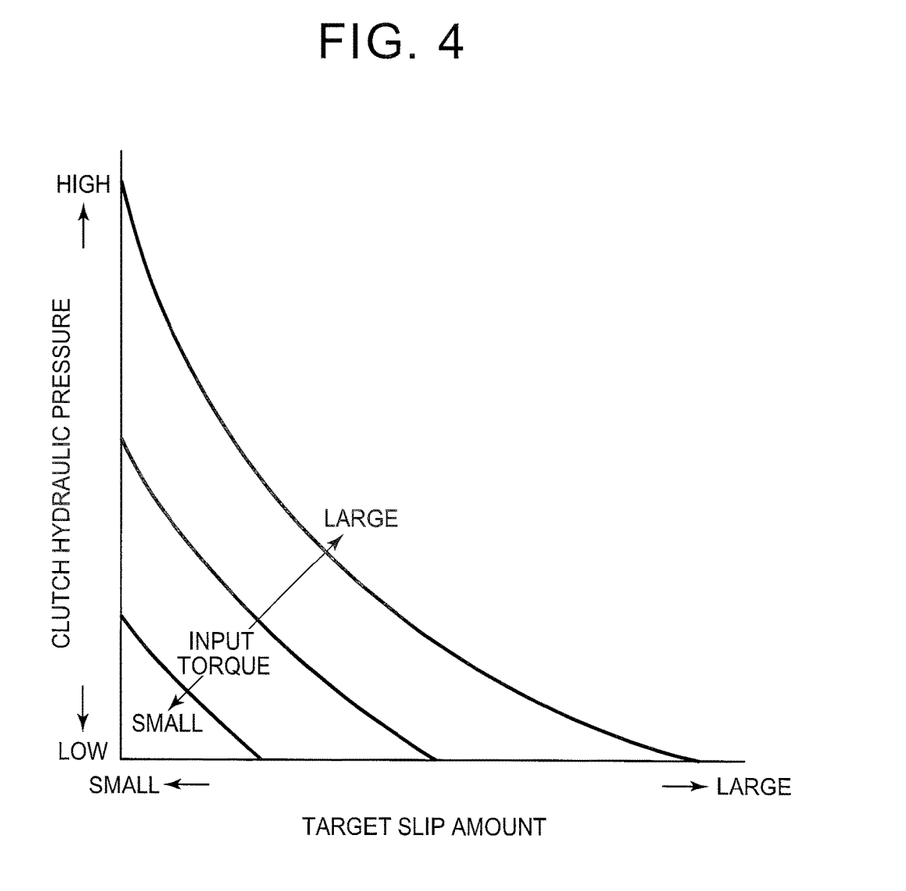
FIG. 4 is a map schematically indicating the relationship among the target slip amount of the friction clutch in the embodiment shown in FIG. 1, hydraulic pressure supplied to the friction clutch, and input torque applied to an input shaft of a fluid coupling.

A hydraulic controller 35 of the ECU 30 functions to control operation of the friction clutch FC, in cooperation with the hydraulic control circuit O. When the operating state determining unit 31 of the ECU 30 determines, based on the detection signal from the final reduction gear speed sensor S6, that the power transmission system TM is in its resonance region, the hydraulic controller 35 changes the slip amount of the friction clutch FC in accordance with the magnitude of vibration of the power transmission system TM. More specifically, the hydraulic controller 35 of the ECU 30 stores a map as shown in FIG. 3, which specifies in advance the relationship between the magnitude of variation of the output torque corresponding to the vibration of the power transmission system TM, and the target slip amount of the friction clutch FC. The hydraulic controller 35 reads a target slip amount $\Delta N_0$ corresponding to the magnitude of variation of the output torque resulting from resonance of the power transmission system TM, and supplies a hydraulic pressure corresponding to the target slip amount $\Delta N_0$, i.e., hydraulic oil whose pressure is set to a target hydraulic pressure $P_0$, to the friction clutch FC. The target hydraulic pressure $P_0$ varies according to input torque applied to the input shaft 41 of the fluid coupling 40. The hydraulic controller 35 stores a map as shown in FIG. 4, which specifies in advance the relationship among the target slip amount, target hydraulic pressure, and the input torque applied to the input shaft 41 of the fluid coupling 40. The hydraulic controller 35 reads a target hydraulic pressure $P_0$, based on the target slip amount, and the input torque applied to the input shaft 41 of the fluid coupling 40, and supplies the target hydraulic pressure $P_0$ thus read to the friction clutch FC. Then, the hydraulic controller 35 controls the hydraulic pressure supplied to the friction clutch FC, so that the friction clutch FC slips by the target slip amount $\Delta N_0$.

Figure 5:
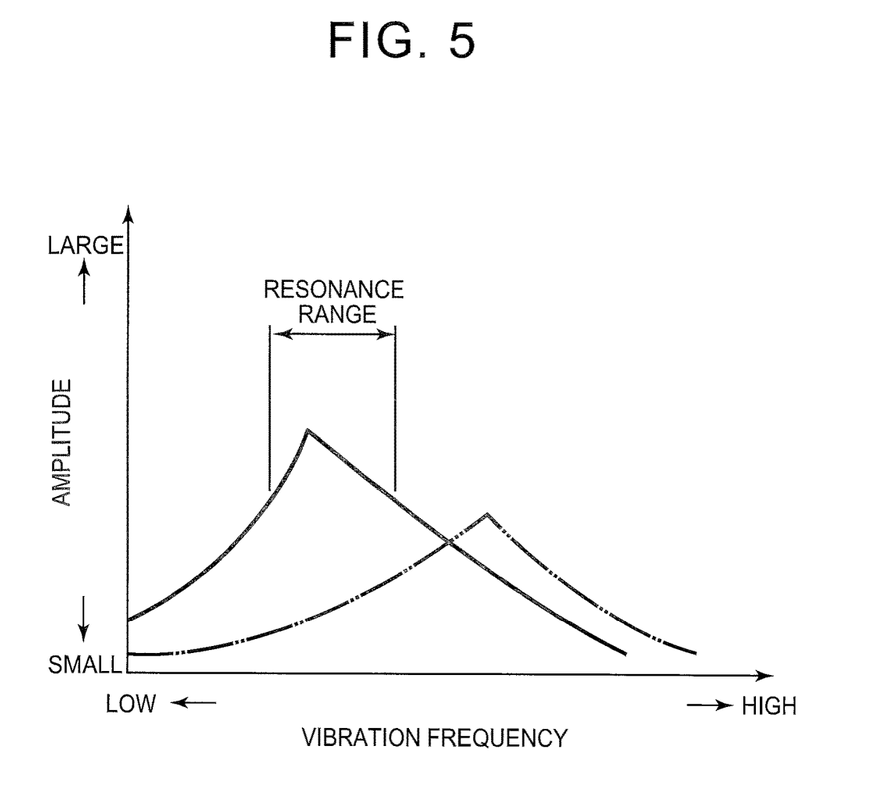
FIG. 5 is a graph schematically indicating the relationship between the vibration frequency of the power transmission system in the embodiment shown in FIG. 1, and the amplitude of the vibration.

In the above manner, the friction clutch FC is shifted from a lock-up state to a slip state, so that the friction clutch FC functions as a damper for absorbing vibration generated in the power transmission system TM. Also, working oil, such as automatic transmission oil, present between the pump impeller 45 and turbine runner 46 of the fluid coupling 40 also functions as a damper. As a result, vibration characteristics of the power transmission system TM shift from a condition indicated by a solid line as shown in FIG. 5 by way of example, to a higher vibration frequency range as indicated by a two-dot chain line in FIG. 5, resulting in suppression of the resonance that has been generated.

When the resonance of the power transmission system TM is suppressed or settled by shifting the resonance range in the above manner, the hydraulic controller 35 of the ECU 30 supplies hydraulic oil whose pressure is regulated to the lock-up hydraulic pressure $P_U$, to the friction clutch FC again, after a lapse of a predetermined time, so as to avoid hunting of control. In this manner, the friction clutch FC is brought into the lock-up state again. In this embodiment, the hydraulic oil having the lock-up hydraulic pressure $P_U$ corresponding to the input torque is supplied to the friction clutch FC, after a lapse of two seconds from the time when the resonance is eliminated, so that the friction clutch FC is brought into the lock-up state.

Figure 6:
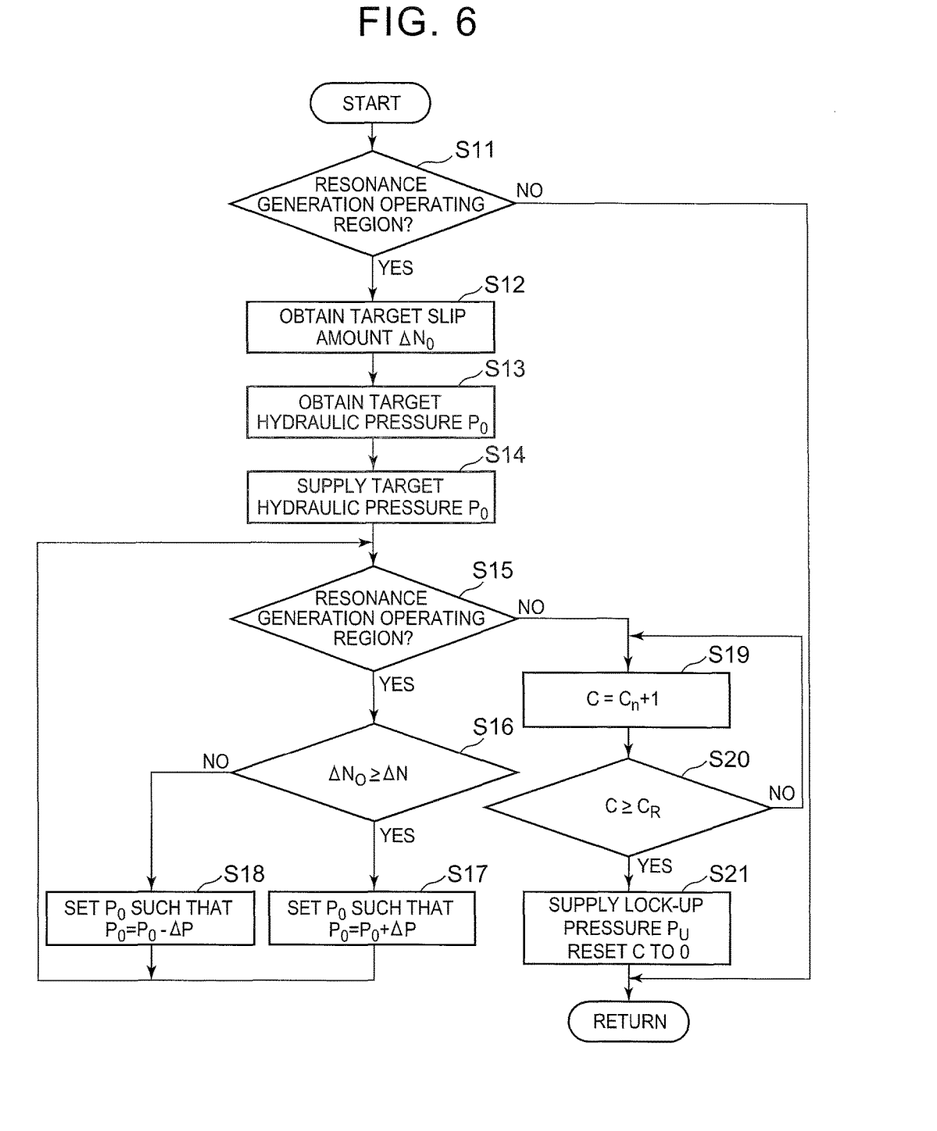
FIG. 6 is a flowchart schematically illustrating the procedure of controlling the hydraulic pressure supplied to the friction clutch in the embodiment shown in FIG. 1.
Figure 7:
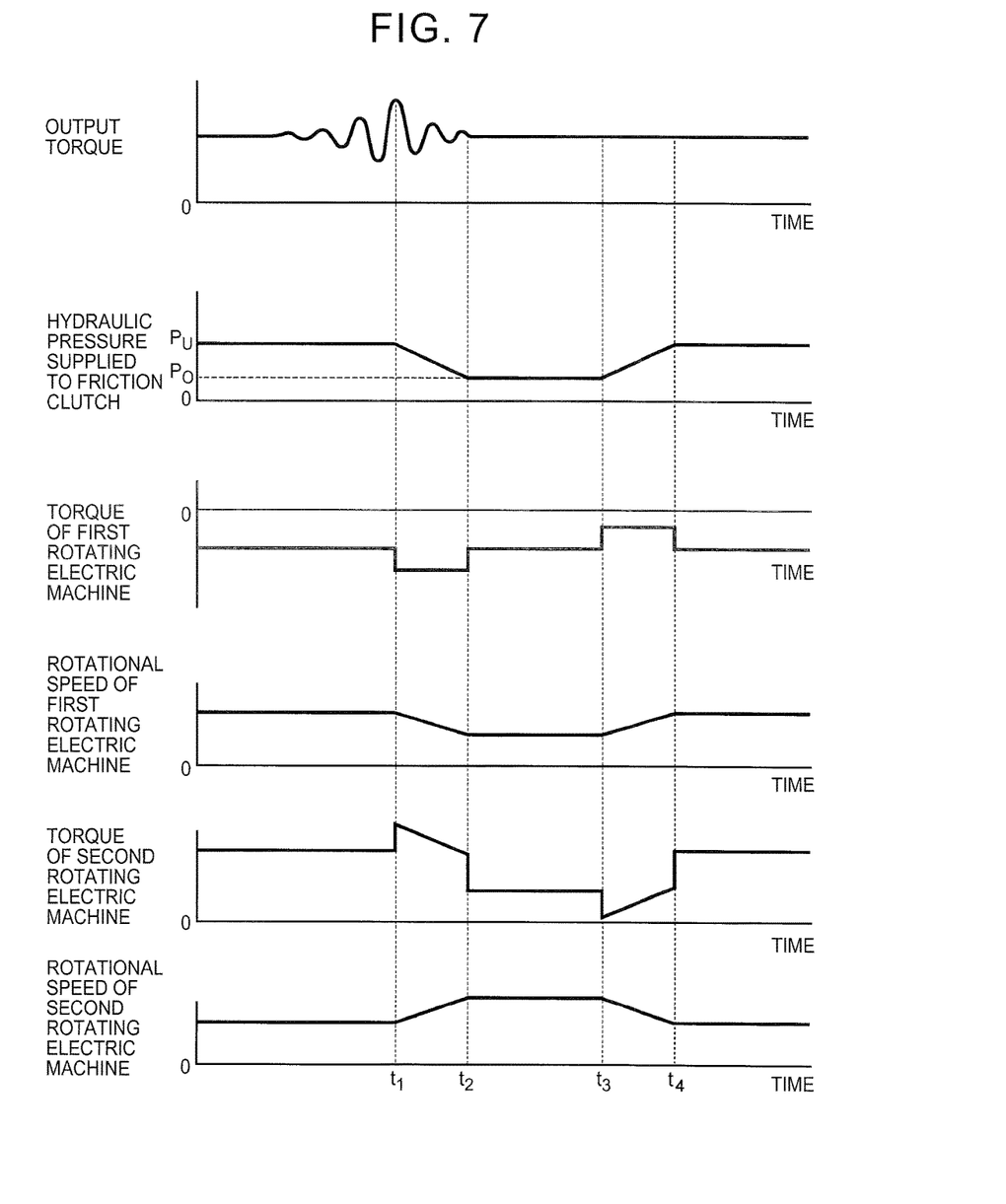
FIG. 7 is a time chart schematically indicating the relationship among changes in output torque caused by vibration generated in a particular portion of the power transmission system located between an engine and drive wheels, hydraulic pressure supplied to the friction clutch, rotary torque of a first rotating electric machine, rotational speed of a rotor of the first rotating electric machine, rotary torque of a second rotating electric machine, and the rotational speed of a rotor of the second rotating electric machine.

FIG. 6 shows the procedure of hydraulic control of the friction clutch FC according to this embodiment, and FIG. 7 schematically shows the relationship among variation of the output torque, hydraulic pressure supplied to the friction clutch FC, rotary torques of the first and second rotating electric machines 10, 20, and the rotational speeds of these rotating electric machines 10, 20. Initially, it is determined in step S11 whether the vehicle is in a region where resonance is generated in the power transmission system TM. If it is determined that the power transmission system TM is in the resonance generation region, namely, there is a need to eliminate resonance of the power transmission system TM (see time $t_1$ of FIG. 7), the control proceeds to step S12. In step S12, the slip amount of the friction clutch FC corresponding to the amplitude of resonance of the output torque, namely, the target slip amount $\Delta N_0$, is obtained. Then, in step S13, a hydraulic pressure to be supplied to the friction clutch FC according to the target slip amount $\Delta N_0$, namely, a target hydraulic pressure $P_0$, is obtained. Then, in step S14, the target hydraulic pressure $P_0$ obtained in step S13 is supplied to the friction clutch FC (see time $t_1$ to $t_2$ in FIG. 7). At this time, in order to prevent the driver or passenger from feeling uncomfortable or strange about slipping of the friction clutch FC, the rotational speed of the first rotating electric machine 10 is reduced, and the rotational speed of the second rotating electric machine 20, which corresponds to the rotational speed of the motive power source, is increased at the same time, so that no changes arise in the traveling state of the vehicle. Then, it is determined again in step S15 whether the vehicle is in the region where resonance is generated in the power transmission system TM. Here, if it is determined that the vehicle is still in the resonance generation region of the power transmission system TM, namely, the power transmission system TM is kept in the resonant condition, the control proceeds to step S16, to determine whether the current slip amount $\Delta N$ is equal to or smaller than the target slip amount $\Delta N_0$. If it is determined in step S16 that the current slip amount $\Delta N$ is equal to or smaller than the target slip amount $\Delta N_0$, namely, the friction clutch FC needs to slip by a further amount, the control proceeds to step S17. Then, after the hydraulic pressure $P_0$ to be supplied to the friction clutch FC is reduced by a predetermined value ΔP from the currently supplied hydraulic pressure, so as to increase the slip amount of the friction clutch FC, the control returns to step S15 again, to determine whether the vehicle is in the resonance generation region of the power transmission system TM.

If, on the other hand, it is determined in step S16 that the current slip amount ΔN exceeds the target slip amount $ΔN_0$, namely, the slip amount of the friction clutch FC needs to be reduced, the control proceeds to step S18. Then, after the hydraulic pressure $P_0$ to be supplied to the friction clutch FC is increased by a predetermined value ΔP from the currently supplied hydraulic pressure, so that the slip amount of the friction clutch FC is reduced, the control returns to step S15 again, to determine whether the vehicle is in the resonance generation region of the power transmission system TM.

If it is determined in step S15 that the vehicle is not in the resonance generation region of the power transmission system TM, namely, the resonance has been eliminated, the control proceeds to step S19, to start counting up the timer (see time $t_2$ in FIG. 7). Then, it is determined in step S20 whether the count value C of the timer is equal to or larger than a preset threshold value $C_R$. If the count value C of the timer is smaller than the threshold value $C_R$, the control returns to step S19, and continues counting up the timer. Then, if it is determined in step S20 that the count value C of the timer is equal to or larger than the threshold value $C_R$, the control proceeds to step S21. In step S21, the lock-up hydraulic pressure $P_U$ corresponding to the input torque applied to the input shaft 41 of the fluid coupling 40 is supplied to the friction clutch FC (see time $t_3$ to $t_4$ in FIG. 7), so as to bring the friction clutch FC back into the normal lock-up state. At the same time, the counter value C of the timer is reset to 0, and then, the control returns to step S11 again.

When it is determined in step S15 that the resonance has been eliminated, it is possible to immediately proceed to step S21, and bring the friction clutch FC back into the normal lock-up state, without counting up the timer. However, if the friction clutch FC is brought back into the normal lock-up state after a lapse of the predetermined time $C_R$, as in this embodiment, when it is determined that the resonance has been eliminated, hunting of slip control for the friction clutch FC can be avoided with higher reliability.

In the above-described embodiment, the first planetary gear train 50 and the second rotating electric machine 20 are connected in parallel to the input shaft 41 of the fluid coupling 40, and the output shaft 42 of the fluid coupling 40 is connected to the drive wheels W side. However, the input shaft 41 of the fluid coupling 40 may be connected to the second rotating electric machine 20, and the first planetary gear train 50 and the output shaft 42 of the fluid coupling 40 may be connected in parallel to the drive wheels W side. Also, a second planetary gear train for multi-speed gearshift and two or more friction engagement elements may be mounted between the first planetary gear train 50 and the engine E.

Figure 8:
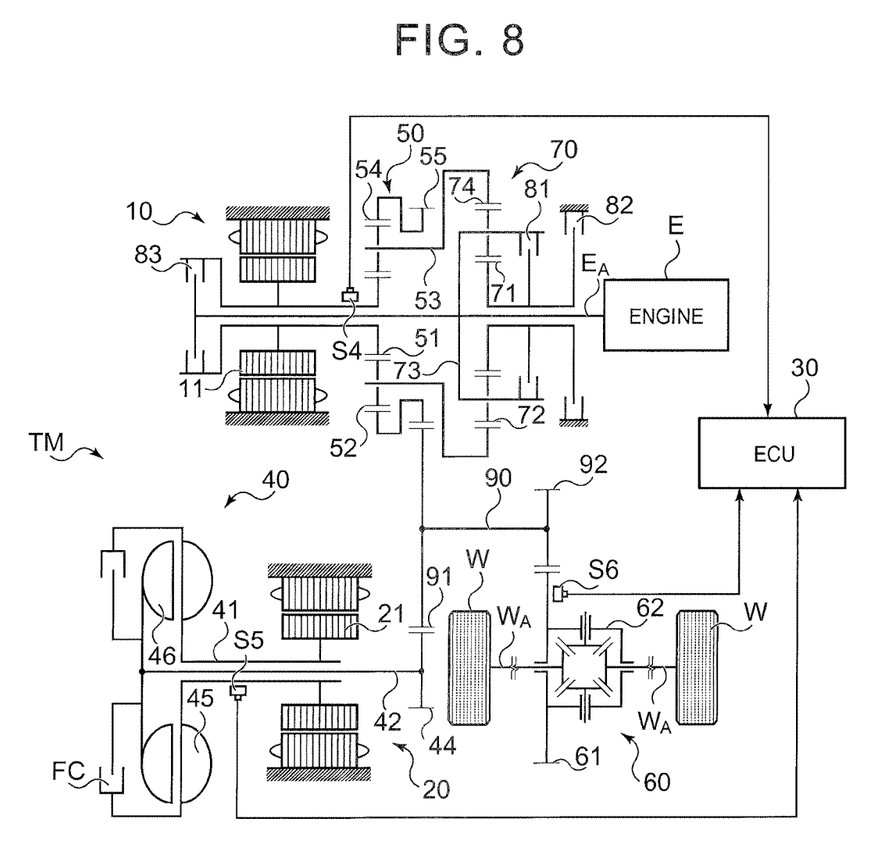
FIG. 8 is a schematic view showing a gear train of another embodiment when it is applied to a hybrid vehicle.

FIG. 8 schematically shows a gear train in a control system of a power transmission system as another embodiment. In FIG. 8, the same reference numerals are assigned to elements having the same functions as those of the previous embodiment, and repeated explanation will not be provided for the sake of simplicity. In the embodiment of FIG. 8, a second planetary gear train 70 has a sun gear 71 that can rotate relative to the crankshaft $E_A$ of the engine E, a carrier 73 that rotatably supports planetary gears 72 that mesh with the sun gear 71, and an internally toothed gear 74 that meshes with the planetary gears 72 so as to surround the gears 72. The sun gear 71 of the second planetary gear train 70 and the carrier 73 of the same train are connected via a first clutch 81 as a friction engagement element, and a brake 82 as a friction engagement element is mounted between the sun gear 71 and a casing (not shown) of the power transmission system TM. The internally toothed gear 74 of the second planetary gear train 70 is integrally coupled to the carrier 53 of the first planetary gear train 50. Also, the crankshaft $E_A$ of the engine E coupled to the carrier 73 of the second planetary gear train 70 is connected to the rotor 11 of the first rotating electric machine 10 via a second clutch 83 as a friction engagement element.

In the meantime, the rotor 21 of the second rotating electric machine 20 is coupled to the input shaft 41 of the fluid coupling 40 of this embodiment. The output gear 44 provided on the output shaft 42 of the fluid coupling 40 meshes with a driven large gear 91 provided at one end of a driven shaft 90, along with the externally toothed gear 55 formed integrally with the internally toothed gear 54 of the first planetary gear train 50. Also, the final reduction gear 61 of the differential gear unit 60 meshes with a driven small gear 92 provided at the other end of the driven shaft 90.

By selectively switching the first clutch 81 and the brake 82 to an engaged state, it is possible to switch the second planetary gear train 70 between an H position having a small speed reduction ratio, and an L position having a larger speed reduction ratio than that of the H position. In this case, the output torque from the engine E and the output torque of the second rotating electric machine 20 are transmitted in a parallel condition to the driven large gear 91 of the driven shaft 90. However, when the first clutch 81 and the brake 82 are placed in non-engaged states, and the second clutch 83 is placed in an engaged state, the output torque of the engine E can be applied to the first rotating electric machine 10 and the input shaft 41 of the fluid coupling 40 via the first planetary gear train 50. In this case, the second planetary gear train 70 does not substantially function as a transmission.

Figure 9:
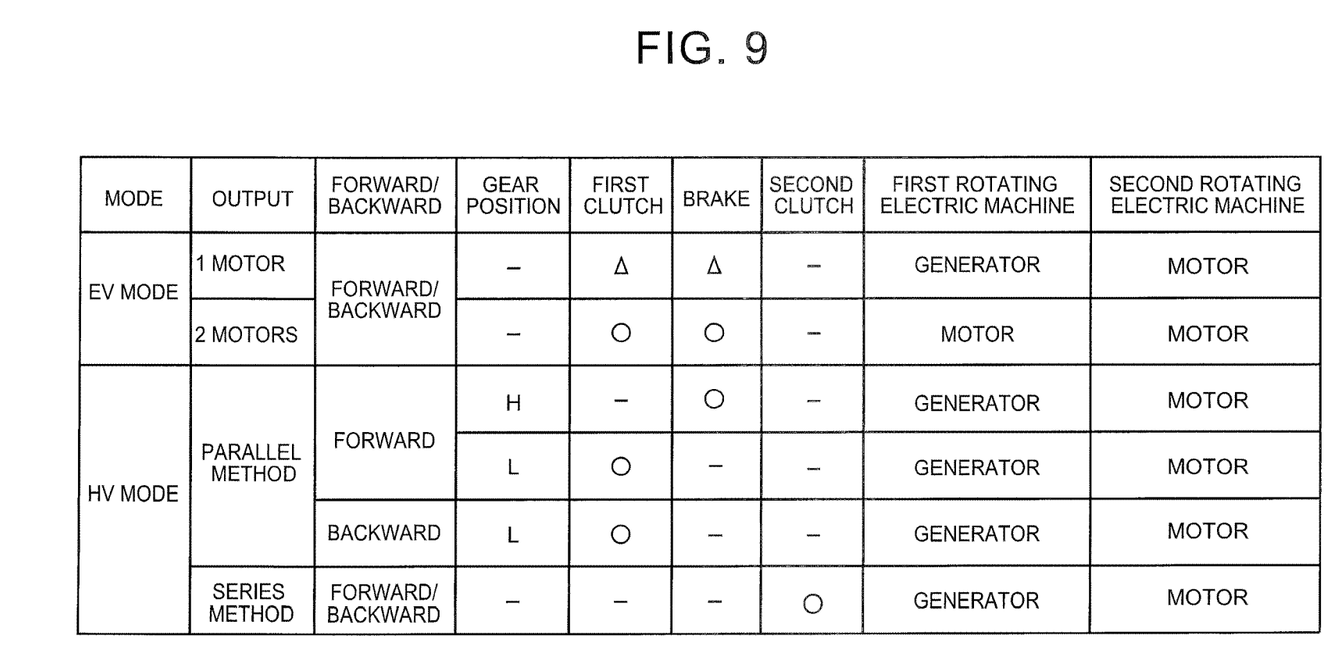
FIG. 9 is an operation engagement table indicating the relationship between each traveling mode and an operating state of each friction engagement element in the embodiment shown in FIG. 8.

FIG. 9 shows the relationship between each traveling mode and the operating state of each friction engagement element in this embodiment.

In the EV mode, the vehicle can be switched between a mode in which the first rotating electric machine 10 functions as a generator, and the second rotating electric machine 20 functions as a motor, and a mode in which both the first rotating electric machine 10 and the second rotating electric machine 20 function as motors, in both of the cases where the vehicle travels forward and backward. The ECU 30 switches the vehicle between these modes, based on the SOC and the accelerator pedal stroke. When both the first rotating electric machine 10 and the second rotating electric machine 20 function as motors, the first clutch 81 and the brake 82 are both held in the engaged states. In the EV mode, when the accelerator pedal stroke is returned to 0% during traveling of the vehicle, or when the brake pedal (not shown) is depressed, either one of the first clutch 81 and the brake 82 is switched to the engaged state. As a result, the second rotating electric machine 20 functions as a generator, and its regenerative energy is stored in the secondary battery B via the first rotating electric machine 10.

In the HV mode, the vehicle can be switched between a parallel method in which the output torque of the engine E can be applied to the drive wheels W side, and a series method in which the output torque of the engine E is applied to the second rotating electric machine 20. In the case of the parallel method, it is possible to switch the gear position between the H position and the L position according to the vehicle speed and the accelerator pedal stroke.

In this embodiment, too, information concerning vibration of the power transmission system TM is obtained by the final reduction gear speed sensor S6, and the friction clutch FC is shifted from the fully engaged state to the slip state when resonance is generated in the power transmission system TM. In this manner, resonance of the power transmission system TM can be promptly eliminated.

While the motive power source consists of one engine E and the first and second rotating electric machines 10, 20 in the above-described embodiments, this disclosure may be applied to a hybrid vehicle in which one engine and one rotating electric machine constitute the motive power source. For example, the arrangement of the first rotating electric machine 10 and the first planetary gear train 50 may be eliminated from the embodiment as shown in FIG. 8, such that the output of the engine E is transmitted to the driven large gear 91 of the driven shaft 90 directly or via the second planetary gear train 70.

The above-described embodiments may be subjected to various modifications.

What is claimed is:

1. A control system of a power transmission system, the power transmission system including a first rotating electric machine, a second rotating electric machine, a fluid coupling having an input shaft coupled to the second rotating electric machine and an output shaft coupled to drive wheels of a vehicle, and an engagement device, the engagement device being configured to control a condition of connection between an input shaft side and an output shaft side of the fluid coupling, the control system comprising:
an electronic control unit configured to:
obtain information concerning vibration of the power transmission system;
determine whether the vibration of the power transmission system is in a resonance region of the power transmission system;
control the engagement device so that the engagement device slips, when the electronic control unit determines that the power transmission system is in the resonance region;
control the first rotating electric machine when the electronic control unit determines that the power transmission system is in the resonance region, so that a rotational speed of the first rotating electric machine decreases as compared with a case where the power transmission system is not in the resonance region; and
control the second rotating electric machine when the electronic control unit determines that the power transmission system is in the resonance region, so that a rotational speed of the second rotating electric machine increases as compared with a case where the power transmission system is not in the resonance region.

2. The control system according to claim 1, wherein the information concerning vibration of the power transmission system includes information concerning mechanical vibration of a particular portion of the power transmission system.

3. The control system according to claim 1, wherein the information concerning vibration of the power transmission system includes information concerning variation of output torque.

4. The control system according to claim 1, wherein the information concerning vibration of the power transmission system includes information concerning variation of a rotational speed on the output shaft side of the fluid coupling.

5. The control system according to claim 1, wherein the electronic control unit is configured to control the engagement device so that a slip amount of the engagement device increases as the vibration of the power transmission system increases, when the electronic control unit determines that the power transmission system is in the resonance region.

6. The control system according to claim 1, wherein the electronic control unit is configured to control the engagement device so that a slip amount of the engagement device becomes equal to 0, when the electronic control unit determines that the power transmission system is no longer in the resonance region after having been in the resonance region.

7. The control system according to claim 1, wherein a slip amount of the engagement device includes a fully released state of the engagement device.

8. A control system of a power transmission system, the power transmission system including a first rotating electric machine, a second rotating electric machine, a fluid coupling having an input shaft coupled to the second rotating electric machine and an output shaft coupled to drive wheels of a vehicle, and a clutch, the clutch being configured to control a condition of connection between an input shaft side and an output shaft side of the fluid coupling between a completely decoupled condition and a fully coupled condition, the control system comprising:
an electronic control unit configured to:
obtain information concerning vibration of the power transmission system;
determine whether the vibration of the power transmission system is in a resonance region of the power transmission system;
control the clutch to a slipping condition between the completely decoupled condition and the fully coupled condition so that the clutch slips, when the electronic control unit determines that the power transmission system is in the resonance region;
control the first rotating electric machine when the electronic control unit determines that the power transmission system is in the resonance region, so that a rotational speed of the first rotating electric machine decreases as compared with a case where the power transmission system is not in the resonance region; and
control the second rotating electric machine when the electronic control unit determines that the power transmission system is in the resonance region, so that a rotational speed of the second rotating electric machine increases as compared with a case where the power transmission system is not in the resonance region.

9. The control system according to claim 8, wherein the information concerning vibration of the power transmission system includes information concerning mechanical vibration of a particular portion of the power transmission system.

10. The control system according to claim 8, wherein the information concerning vibration of the power transmission system includes information concerning variation of output torque.

11. The control system according to claim 8, wherein the information concerning vibration of the power transmission system includes information concerning variation of a rotational speed on the output shaft side of the fluid coupling.

12. The control system according to claim 8, wherein the electronic control unit is configured to control the clutch so that a slip amount of the clutch increases as the vibration of the power transmission system increases, when the electronic control unit determines that the power transmission system is in the resonance region.

13. The control system according to claim 8, wherein the electronic control unit is configured to control the clutch so that the clutch is placed in the fully coupled condition in which a slip amount of the clutch becomes equal to 0, when the electronic control unit determines that the power transmission system is no longer in the resonance region after having been in the resonance region.

14. The control system according to claim 8, wherein the clutch includes is a friction clutch.

15. The control system according to claim 1, wherein the power transmission system includes a planetary gear train having a first rotating member coupled to the first rotating electric machine, a second rotating member coupled to an output shaft of an engine of the vehicle, and a third rotating member coupled to the input shaft of the fluid coupling.

16. The control system according to claim 8, wherein the power transmission system includes a planetary gear train having a first rotating member coupled to the first rotating electric machine, a second rotating member coupled to an output shaft of an engine of the vehicle, and a third rotating member coupled to the input shaft of the fluid coupling.

* * * * *